United States Patent
Schmitt (10) Patent No.: US 8,016,106 B2
(45) Date of Patent: Sep. 13, 2011

(54) RIGID TRANSPARENT TACKLE BOX WITH VERTICAL STORAGE FOR LARGE-SCALE LURES

(75) Inventor: Robert J. Schmitt, Excelsior, MN (US)

(73) Assignee: Just Encase Products, Inc., Excelsior, MN (US)

( * ) Notice: Subject to any disclaimer, the term of this patent is extended or adjusted under 35 U.S.C. 154(b) by 98 days.

(21) Appl. No.: 12/455,890

(22) Filed: Jun. 9, 2009

(65) Prior Publication Data

US 2010/0307939 A1 Dec. 9, 2010

(51) Int. Cl.
*B65D 85/00* (2006.01)
*B65D 25/00* (2006.01)

(52) U.S. Cl. .................. 206/315.11; 43/54.1; 43/57.1

(58) Field of Classification Search ............. 206/315.11; 43/54.1, 57.1
See application file for complete search history.

(56) References Cited

U.S. PATENT DOCUMENTS

| | | | | |
|---|---|---|---|---|
| 3,490,169 | A * | 1/1970 | Tweed | 43/57.1 |
| 3,947,991 | A * | 4/1976 | Morcom | 43/54.1 |
| 3,948,579 | A * | 4/1976 | Schirmer | 312/111 |
| 4,756,412 | A * | 7/1988 | Graves et al. | 206/315.11 |
| 6,381,126 | B1 | 4/2002 | Yoshimoto et al. | |
| 6,809,254 | B2 | 10/2004 | Clement et al. | |
| 6,914,774 | B1 | 7/2005 | Albertini et al. | |
| D514,096 | S | 1/2006 | Storti et al. | |
| 7,069,063 | B2 | 6/2006 | Halkosaari et al. | |
| 7,278,234 | B2 * | 10/2007 | Marino | 43/54.1 |
| 2007/0011939 | A1 * | 1/2007 | Sakai | 43/54.1 |

* cited by examiner

*Primary Examiner* — J. Gregory Pickett
(74) *Attorney, Agent, or Firm* — Kinney & Lange, P.A.

(57) ABSTRACT

A storage system comprises a bottom, a plurality of sides, a cover and a plurality of vertical dividers. The sides are fixed to the bottom and the cover is located to have open and closed positions with respect to the sides, opposite the bottom. The vertical dividers are arranged in first and second transverse orientations between the sides, forming vertical storage units for hanging lures. A plurality of ventilation and drainage holes are formed in the bottom panel, and the top and at least two of the sides are transparent to visible light. Each of the bottom, sides, and cover is formed of an impact-resistant thermoplastic having a thickness of at least 4 mm, such that the cover supports a weight of at least 220 lbs when in the closed position.

19 Claims, 7 Drawing Sheets

RIGID TRANSPARENT TACKLE BOX WITH VERTICAL STORAGE FOR LARGE-SCALE LURES

BACKGROUND

This invention relates generally to equipment storage, and specifically to the storage of fishing equipment for professional and amateur anglers. In particular, the invention concerns a tackle box for storing artificial lures.

Angling includes a variety of pole, casting and trolling techniques, which are widely used in both saltwater and freshwater fisheries. Nationwide, there are an estimated fifty million or more recreational anglers, including some ten to twelve million who fish in at least part time in ocean waters. Angling is also an important economic activity, not only for tourism and related industries but also in commercial fisheries where longline, downrigger and other trolling techniques are used, and on professional fishing circuits for bass, walleye and other game fish.

In each of these areas anglers utilize a range of natural and artificial baits, with the latter available in a wide variety of different sizes, shapes and styles. As a result there is a constant need for improved tackle storage systems, and a particular need for systems that combine durability, security and ease of access in an aesthetic and economical package, and which are applicable across a broad range of fishing environments.

SUMMARY

This invention is directed to a tackle storage system for artificial lures. The storage system includes bottom, side, and cover panels connected to form a tackle box. The side panels are fixed to the bottom panel in vertical orientations, and the cover panel opens and closes to provide access to the interior. Divider panels are arranged vertically between the side panels, and oriented in two transverse directions to form vertical storage units for hanging the artificial lures.

The bottom, side, and cover panels are formed of a strong, impact-resistant panel material having a thickness of at least 4 mm, such that the cover supports a weight of at least 220 lbs when in the closed position. The top panel and at least two of the side panels are transparent, providing an interior view through the box. The bottom panel is provided with holes for drainage and ventilation.

DETAILED DESCRIPTION

Figure 1:
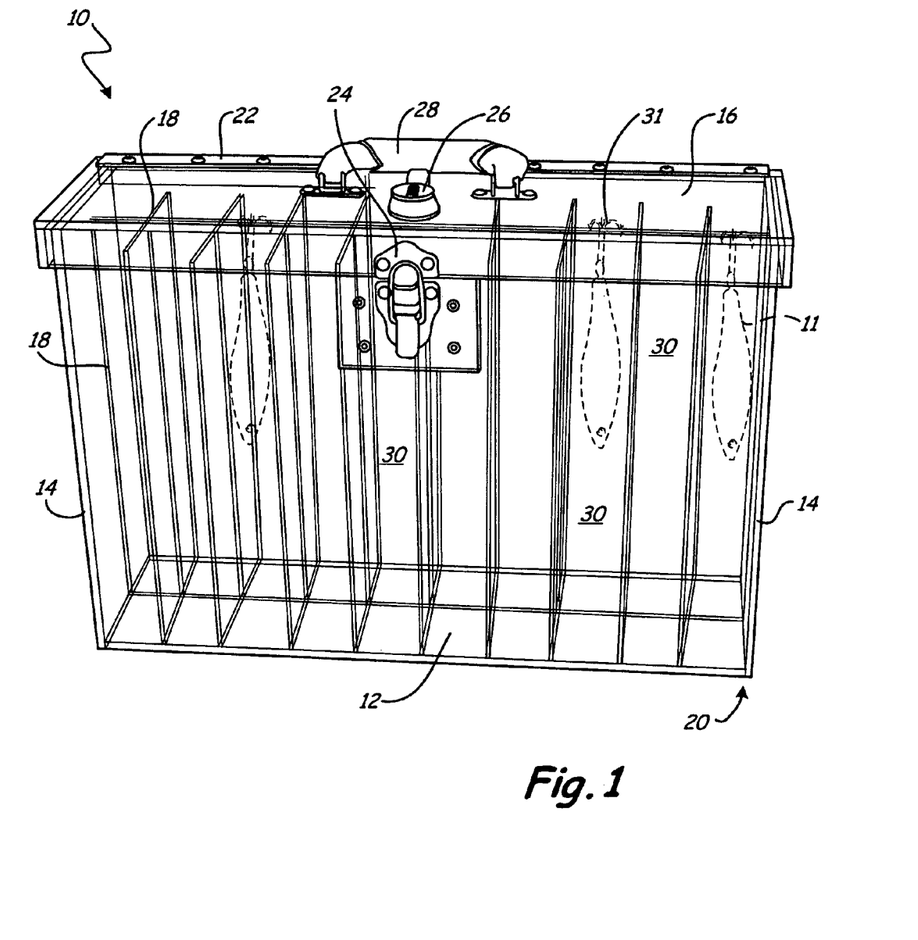
FIG. 1 is a perspective view of a vertical tackle storage system, with cover panel in a closed position.

FIG. 1 is a perspective view of system 10 for secure storage of tackle including artificial lures 11. System 10 comprises bottom panel 12, side panels 14, cover panel 16 and divider panels 18.

As shown in FIG. 1, bottom panel 12 is horizontally oriented. Four vertically oriented side panels 14 are fixed to bottom panel 12 and to one another at seams 20, forming the exterior tackle box structure of system 10. Cover panel 12 is attached to one of side panels (or wall panels) 14 via hinge 22, such that cover panel 12 pivots from open to closed positions (see, e.g., FIG. 2). Depending on embodiment, latch 24, lock 26 and handle 28 are provided on cover panel 12 or one of side panels 14, or both, in order carry and secure storage system 10 when cover panel 12 is closed and latch 24 is in a secured or locked position.

Divider panels 18 are arranged between side panels 14 in two transverse vertical orientations, forming individual vertical storage units or bays 30 for artificial lures 11. Lures 11 comprise a variety of artificial baits including spoons, spinner baits, bucktails, plugs, surface lures, crankbaits, jerk baits and other artificial lures, and are provided in a range of different colors, shapes and sizes. Hooks 31 are variously located on lures 11 in a variety of configurations including single, double and treble hook designs, and have both barbed and unbarbed form.

The overall dimensions of tackle storage system 10 depend on the size of artificial lures 11 and the number to be stored, and on additional considerations such as portability and available boat or vehicle storage area. In particular, because lures 11 include larger-scale artificial baits for muskellunge and saltwater game fish, vertical storage bays 30 are substantially larger than in smaller-scale tackle box designs. In typical embodiments, for example, storage bays 30 have a height of at least 10 inches (about 25 cm), with an opening area of at least 4 square inches (about 25 square cm). The maximum bay height is generally less than about 36 inches (about 90 cm), in order to maintain stability and portability, and typically less than about 30 inches (about 75 cm), as described below with respect to the representative embodiments of FIGS. 4A and 4B.

In contrast with thin-walled tackle box designs, moreover, each of bottom, side and cover panels 12, 14 and 16 is formed of a strong, impact-resistant panel material having a thickness of at least 4 mm (about 5/32 inch), for example about 5-6 mm (about 3/16-1/4 inch). Typically, each of bottom, side and cover panels 12, 14 and 16 has approximately the same thickness, but in some embodiments one or more panels has greater thickness for additional weight, rigidity and strength, for example about 10-13 mm (about 3/8-1/2 inch).

The thickness of panels 12, 14 and 16 increases weight and material costs, but also provides system 10 with a stronger, more rigid construction than is available in thin-walled designs, particularly those with wall or panel thickness of less than 4 mm, for example 1-3 mm (about 1/16-1/8 inch) or less. In particular, cover panel 16 closes to span the full length and width of side panels 14, providing sufficient strength and rigidity to support an adult angler weighing at least 220 lbs (that is, with a mass of at 100 kg or more).

Divider panels 18 are typically made of the same material as exterior (bottom, top and side) panels 12, 14 and 16, then nested together to form vertical storage bays 30. Dividers 18 are also typically somewhat thinner than the exterior panels, for example about 3 mm (about ⅛ inch) or more or about 4 mm (about 5/32 inch) or less. Alternatively, dividers 18 have about the same minimum thickness as bottom, side and cover panels 12, 14 and 16, in order to provide greater weight and strength.

Depending on embodiment, dividers 18 are either fixed together to form vertical storage bays 30 as a single rigid unit, or nested together in individually removable fashion. In the former embodiment, dividers 18 are sometimes also fixed to one or more of side panels 14, providing greater overall strength and rigidity to system 10. Typically, however, at least the top portions of dividers 18 are not fixed, allowing the angler or other user to flex divider panels 18 in order to widen the opening to individual storage bays 30, improving access to storage system 10.

The use of vertical dividers 18 provides system 10 with a vertical lure storage configuration, as opposed to the horizontal configuration of other tackle box designs. In principle this reduces volume storage efficiency, because the need to accommodate a range of different lure lengths means that not all lures 11 will extend to the full height of each individual vertical storage bays 30. It is difficult to utilize the extra space, moreover, because the hanging lures block access to the bottom (unused) sections of tackle box 10.

The advantage, however, is that system 10 nonetheless provides greater horizontal storage efficiency. While vertical storage bays 30 may sometimes require additional volume, that is, vertically stored lures 11 nonetheless take up less surface area than when laid out flat, allowing system 10 to provide simultaneous access to more vertical bays 30 and more lures 11 than is possible with a horizontal tray-type design.

At the same time, system 10 occupies less square footage in the boat, where it is often in short supply. By opening cover panel 16 to an approximately vertical or ninety-degree position, that is, system 10 provides full access to each storage bay 30 within the footprint of bottom panel 12, and without requiring additional access area in the surrounding region. Horizontal storage systems, in contrast, typically employ stacked shelving or "cantilevered" designs, in which the storage units open outside the base footprint and require additional access area. Horizontal designs are also subject to tipping, particularly when using large, heavy lures and lightweight tackle box designs.

Vertical storage system 10, on the other hand, provides simultaneous access to each individual storage unit 30 without occupying additional horizontal area, avoiding tipping instability because cover panel 16 provides full access without repositioning lures 11 outside the footprint of bottom panel 12. Depending on embodiment, moreover, vertical storage system 10 has an empty weight of about 13 lbs or more (that is, a mass of about 6 kg or more), and is stable against tipping when exposed to horizontal wind speeds of about 40 mph (about 65 km/hour) or more, as verified in on-boat field testing of various production models. In some embodiments, vertical storage system 10 has a weight of 18-24 lbs (a mass of about 8-11 kg), and is stable against tipping when exposed to horizontal wind speeds of about 50 mph (about 80 km/hour) or more.

Figure 2:
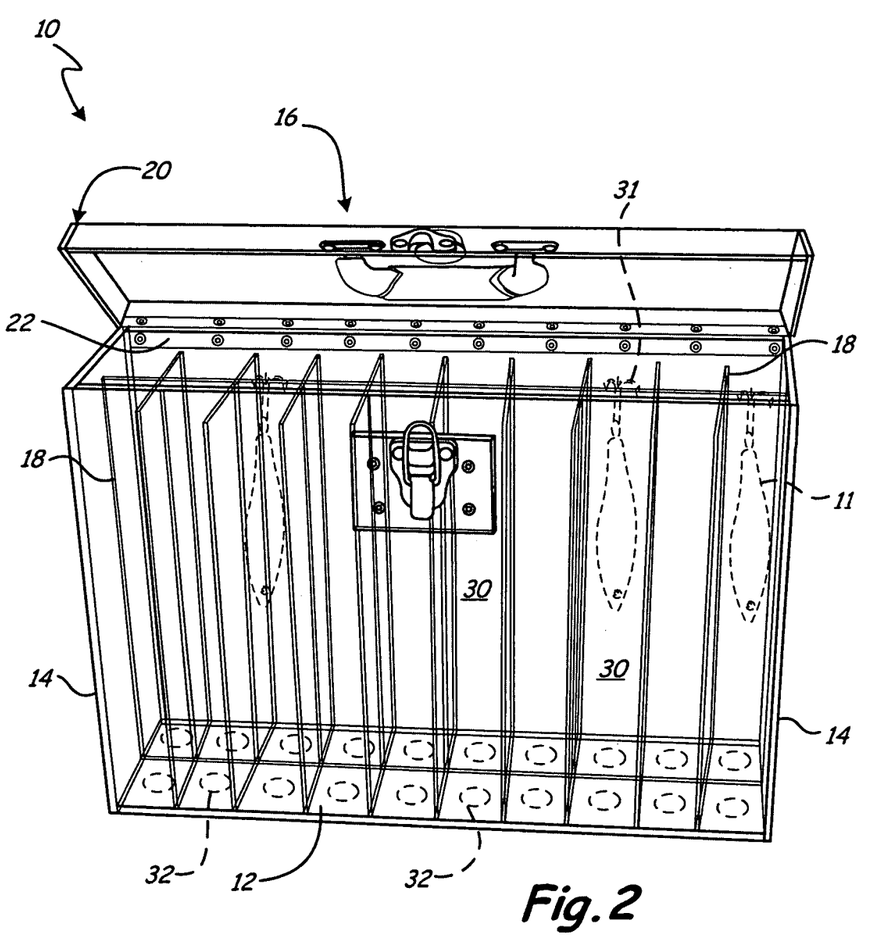
FIG. 2 is a perspective view of the tackle storage system in FIG. 1, with cover panel in an open position.

FIG. 2 is a perspective view of tackle storage system 10, with cover panel 16 in an open position. System 10 comprises bottom, side and top cover (or door) panels 12, 14 and 16, respectively, with dividers 18 to form vertical storage bays 30 as described above. Holes 32 are formed in bottom panel 12, in order to provide ventilation and drainage.

As shown in FIG. 2, hinge 22 allows cover panel 12 to pivot or rotate between open and closed positions. In this particular embodiment, hinge 22 comprises a continuous living hinge formed of a resilient, flexible and fatigue-resistant polymer such as polypropylene, which is fastened with moisture-resistant painted aluminum rivets along substantially the entire horizontal length of cover panel 12. Alternatively, hinge 22 comprises two or more discontinuous pieces such as individual hinge plates and hinge pins, and utilizes a variety of different materials such as aluminum, steel, brass and other metals or plastics, or combinations thereof. In these embodiments, hinge 22 is fastened to tackle box 10 via a variety of mechanical fasteners such as rivets, screws and bolts.

In contrast to water-tight designs and designs that are indifferent to the issues of drainage and ventilation, system 10 provides for substantial fluid flow through individual storage bays 30. In particular, a plurality of ventilation and drainage holes 32 are distributed in bottom panel 12, typically with a diameter of approximately ⅛-½ inch (about 3-13 mm) in order to discharge precipitation, spray, spills and other sources of moisture from the interior of storage system 10, and to provide airflow for interior drying. This reduces internal moisture levels, improving appearance (and smell), and increasing the service life of both system 10 and lures 11.

Note that while artificial lures are typically moisture resistant, many are still vulnerable to damage when exposed to a combination of water (particularly saltwater) and air for long periods of time. This is a common problem in inadequately ventilated and drained tackle box designs, and results in the corrosion of hooks and other metal parts, loss of color. Mold, rot and decay can also occur, particularly in wood, natural fiber and biodegradable bait materials.

Ventilation and drainage holes 32 address this problem by discharging water (and other accidentally introduced fluids such as oil, gas, and alcohol), and by providing sufficient airflow to dry lures 11 and the interior of each individual storage bay 30, even with cover 12 in a closed position. Ventilation and drainage holes 32 also allow for water washing of lures 11 (with cover 12 in the open position), for example to rinse off saltwater or remove blood, scales, dirt and remnants of the "slimy" protein-based protective fish coatings commonly found on eels and certain freshwater game fish such as northern pike.

Ventilation and drainage holes 32 also reduce interior temperatures within tackle storage system 10, particularly in hot, sunlit conditions, further reducing the rate of corrosion and other chemical or biological processes. In one field test, for example, conducted in full sun and at approximately 80-90° F. ambient temperature (that is, about 25-30° C.), ventilation and drainage holes 32 limited the interior-exterior temperature differential of system 10 to about 18° F. (about 10° C.) or less. For an unventilated baseline comparison model, on the other hand, the interior-exterior temperature differential was about 36° F. (about 20° C.) or more; that is, more than twice as great as in the ventilated design.

Figure 3:
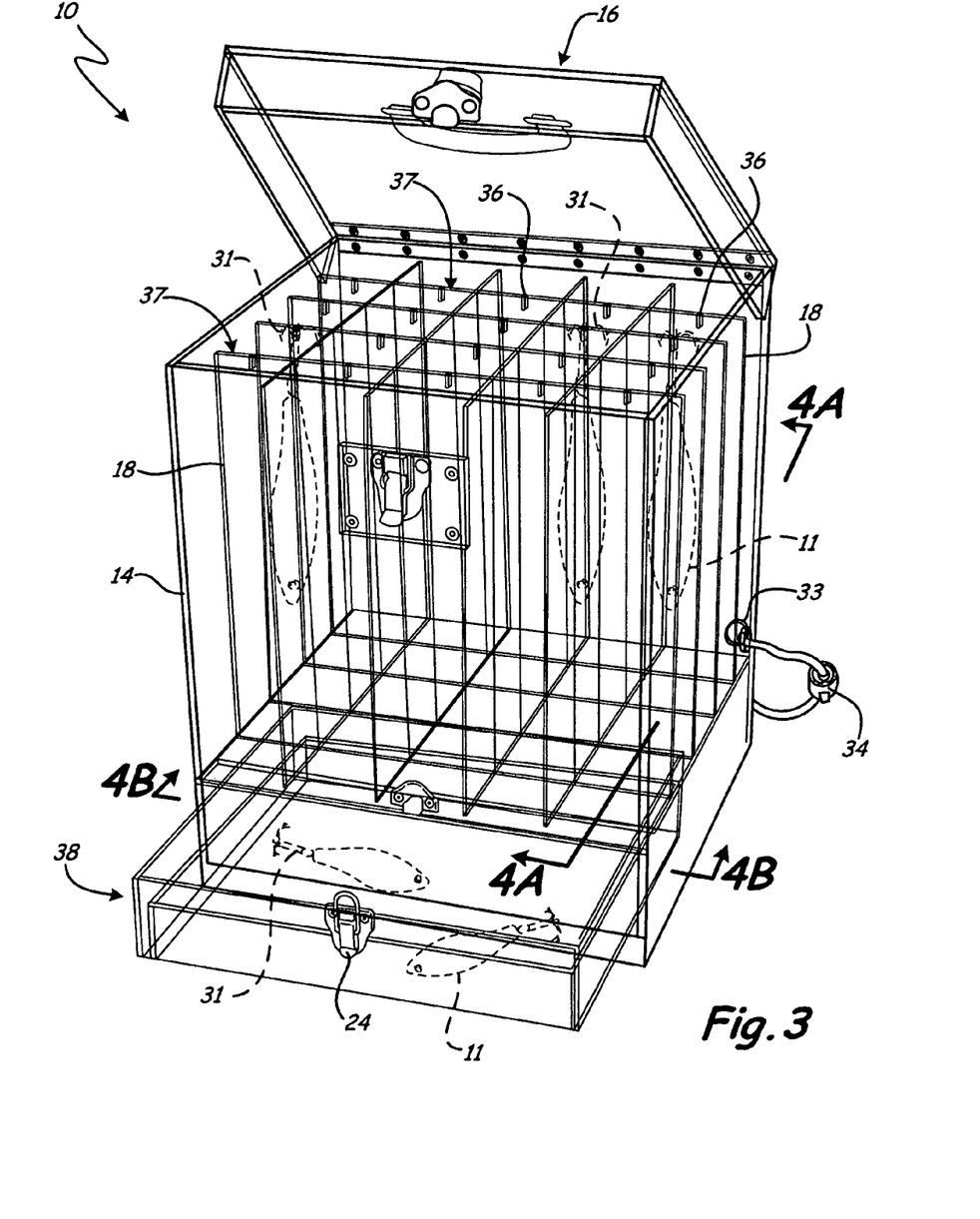
FIG. 3 is a perspective view of the tackle storage system in FIGS. 1 and 2, in an embodiment having a cable lock, hook receivers and a lower drawer for supplemental horizontal storage.

FIG. 3 is a perspective view of tackle storage system 10. In this particular embodiment, system 10 includes cable lock apertures 33 for cable lock 34, hook receivers 36 for hooks 31, and lower drawer 38 for supplemental horizontal storage.

As shown in FIG. 3, each of bottom panel 12, side panels 14, top panel 16 and divider panels 18 is transparent. Alternatively, one or more of bottom panel 12 and side panels 14 is painted (or otherwise opaque), but in typical embodiments at least cover panel 16 and two of side panels 14 remain transparent in order to provide interior views of lures 11. This transparent design allows users to assess the condition of lures 11 without opening top panel 16, enabling quick inventory control and on-the-fly decisions about which baits to use while trolling and casting, whether tackle box 10 is open or closed.

Transparent panels 12, 14, 16 and 18 are typically formed of a strong, durable and machinable thermoplastic or polymer. Transparent thermoplastics include acrylic (polymethyl methacrylate, or PMMA; also known as acrylic glass), polycarbonate, and transparent polyethylene terephthalate (PET) materials. Acrylic is available under trade names including Plexiglas®, from Arkema Corporation of Philadelphia, Pa., and Lucite® or Perspex®, from Lucite International of Cordova, Tenn. Polycarbonates are bisphenol A-based polycarbonate resin thermoplastics, and are available under trade names including Lexan®, from GE Plastics (now SABIC Innovative Plastics) of Pittsfield, Mass., Calibre®, from Dow Chemical of Midland, Mich.; and Panlite®, from Teijin Chemicals of Tokyo, Japan. Transparent PET-based materials are available under trade names including Eastman® PET, from Eastman Chemical Company of Kingsport, Tenn.

While polycarbonate materials can be more expensive than acrylics and PET-based materials, they are also stronger and highly transparent to visible light, making them suitable for a range of specialized applications such as aircraft canopies and "bulletproof" glass. Polycarbonates are also somewhat softer than some acrylics, but can be provided with a scratch-resistant coating such as Lexan® Margard®, from GE Plastics, or with a scratch-resistant protective layer such as SCLARL 150, from 3M Corporation of Saint Paul, Minn.

Hook receivers 36 are formed as a slot or cutout in top edge 37 of one or more divider panels 18, typically with at least one hook receiver 36 in each storage unit 30. Hook receivers 36 allow artificial lures 11 to be hung vertically by hooks 31, just below top edge 37 of divider panels 18. In particular, hook receivers 36 accommodate embodiments in which divider panels 18 extend to the full vertical height storage bins 30 and side panels 14, allowing divider panels 18 to support cover panel 16 without cover panel 16 resting on hooks 31.

Lower storage drawer 38 provides supplemental horizontal storage, which complements the vertical storage provided by bins 30. Depending on embodiment, horizontal storage drawer 38 is either provided with holes for ventilation and drainage, as described above for bottom panel 12 in FIG. 2, or drawer 38 provides an unventilated and substantially watertight storage area to complement the drained and ventilated storage area of vertical bins 30.

As shown in FIG. 3, the front of storage drawer 38 closes approximately flush with the front panel of storage system 10. Alternatively, drawer 38 is recessed inside storage system 10, and provided with a hinged cover that closed flush with the front panel. In either embodiment, drawer 38 can be provided with an additional lock or latching mechanism 24, or a single bar-type lock mechanism can be used to secure both drawer 38 and cover panel 16. In addition, tackle storage system 10 is securable to a boat, trailer or vehicle via cable apertures 33 and cable lock 34.

The strength and security features of tackle storage system 10 are relevant not only in trophy and professional sport fishing, where individual lures can be priced from twenty to forty dollars or more and tackle investments can easily reach into the thousands of dollars, but also in any area where theft, breakage and accidental loss are of concern. In particular, the thick polycarbonate and high-temperature acrylics panels used in system 10 have glass transition temperatures of about 100° C. (about 212° F.) or more, while other designs use thinner materials made of soft, moldable plastics with glass transition temperatures of 30° C. (about 86° F.) or less. No security system is perfect, of course, but the higher phase transition temperatures, thicker-walled structure and other design features of system 10 provide a stronger, more secure storage system that is difficult to defeat without substantial effort and specialized tools, not only providing greater durability but also deterring the most common forms of casual theft.

Figure 4A:
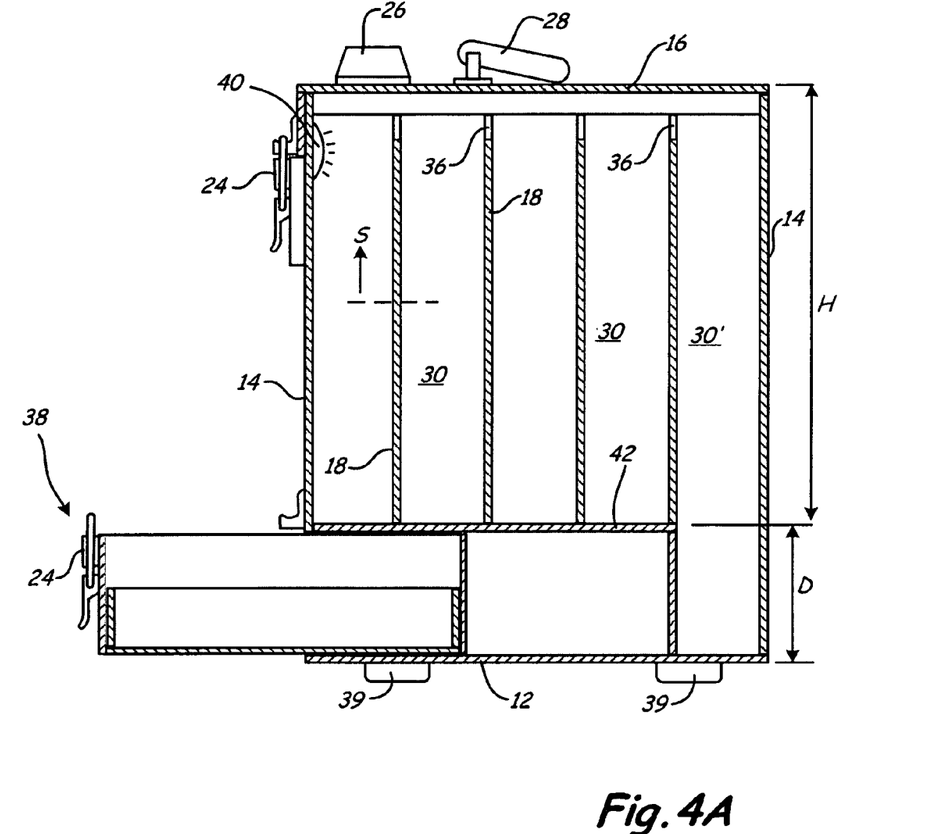
FIG. 4A is a side cross-sectional view of a tackle storage system as embodied in FIG. 3, illustrating construction details.
Figure 4B:
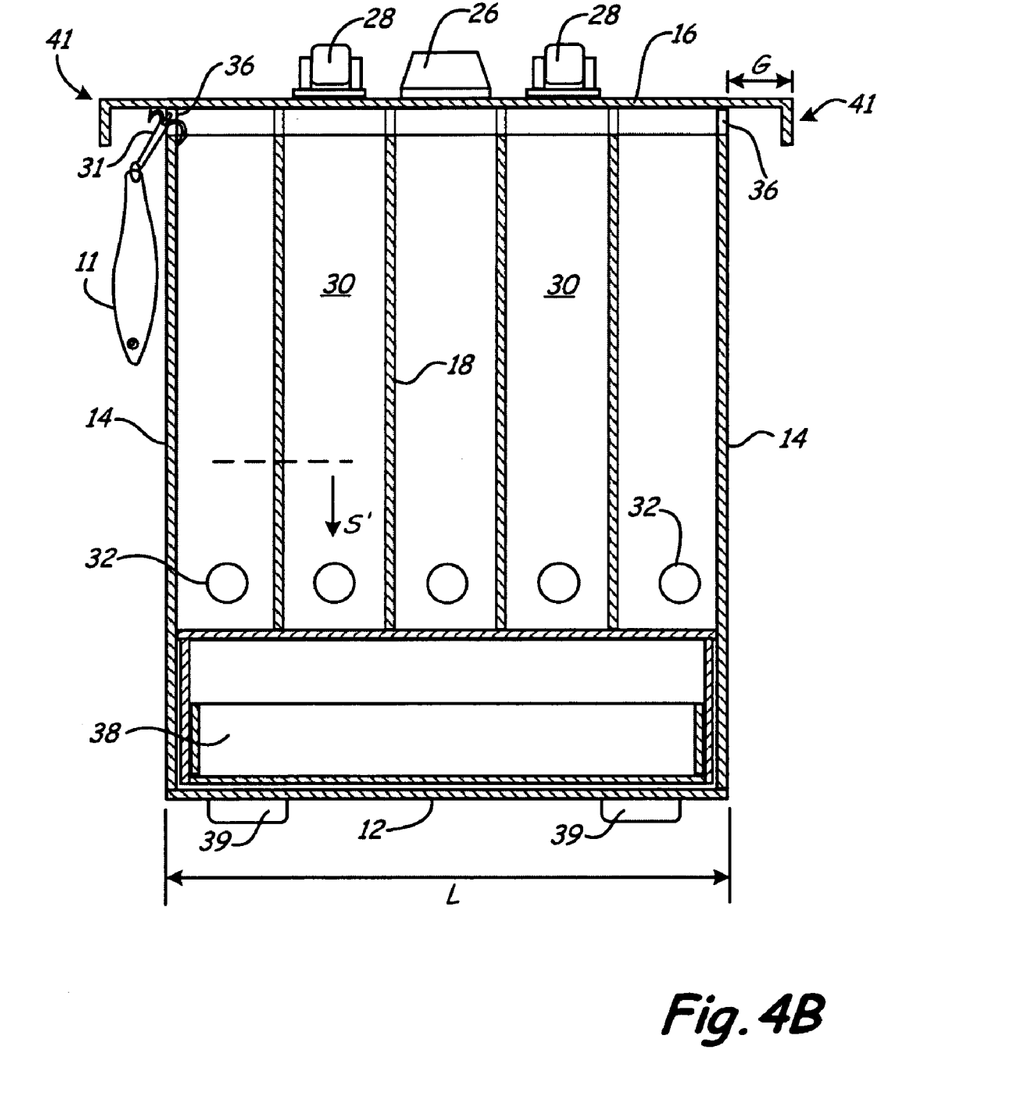
FIG. 4B is a front cross-sectional view of the tackle storage system as embodied in FIG. 3, illustrating additional construction details.

FIGS. 4A and 4B are cross-sectional view of tackle storage system 10, presented in side and front views, respectively, in order to illustrate construction details. In this particular embodiment, system 10 utilizes a clear-panel design with supplemental storage drawer 38, as described above with respect to FIG. 3. In further embodiments, feet 39 are provided for clearance between bottom panel 12 and the boat deck or other supporting surface, and low-power light 40 is provided for night illumination.

In manufacture of system 10, bottom, side and cover panels 12, 14 and 16 are typically cut from a sheet of panel material having a minimum thickness of at least 4 mm (about 5/32 inch), for example about 5-6 mm (about 3/16-1/4 inch) or more. Divider panels 18 are cut from a sheet of similar panel material, either with the same thickness as exterior panels 12, 14 and 16 or from a thinner material, for example about 3 mm (about 1/8 inch) or more, depending upon the desired properties of flexibility, rigidity and strength, as compared to the expected load on cover panel 16.

Side panels 14 are typically joined to one another (and to bottom panel 12) by rabbet joints, which are routed or milled along the inside edge of each panel 12 and 14. In these embodiments, the joint depth is typically about half the panel width. Alternatively, panels 12 and 14 are joined at butt joints or mitered rabbet joints, and the joint depth varies. The exposed edges are usually rounded by milling, routing, cutting or sanding, in order to eliminate sharp corners.

In the particular embodiment of FIGS. 4A and 4B, panels 12 and 14 are fixed together by a combination of dip and capillary gluing. Alternatively, the panels are chemically welded or mechanically fastened with bolts or screws, or fastened together with a combination of mechanical fasteners, chemical welds and adhesive techniques.

Divider panels 18 are nested together by cutting vertical slots to length S on approximately on the top half of the panels running in one vertical orientation (e.g., side to side, as shown in FIG. 4A), and cutting complementary slots to length S' in approximately the bottom half of the panels running in the perpendicular (or transverse) vertical orientation (e.g., front to back, as shown in FIG. 4B). Individual dividers 18 are then nested together to form vertical storage bays 30 in system 10.

Depending on embodiment, the ends of divider panels 18 either butt against the inner surface of side panels 14, or vertical channels or dados are cut in order to hold the ends of panels 18 more securely in place. In addition, divider panels 18 are sometimes fastened together in order to form a single vertical bay unit, as described above, and sometimes fastened to side panels 14 in order to provide additional rigidity, strength and support.

Alternatively, dividers 18 are not fastened together but instead are individually separable from the vertical bay unit, and individually removable from the interior of storage system 10. In these embodiments, a number of vertical dados or channels are sometimes provided in different positions along side panels 14, allowing dividers 18 to be adjusted into different locations within storage system 10. This allows vertical storage bays 30 to be formed in a variety of shapes and sizes, typically by utilizing a complementary set of vertical slots S and S', as provided in corresponding locations along divider panels 18.

Depending on the thickness and height divider panels 18 also provide additional support for cover panel 16. In particular, when divider panels 18 are formed to approximately the same height as side panels 14 (that is, extending approximately to cover panel 16), cover panel 16 is supported on dividers 18 as well as side panels 14. In this embodiment, system 10 typically provides sufficient horizontal area, strength and rigidity to support two or more adult anglers on cover panel 16, with a total weight of at least about 440 lbs (that is, a total mass of at least 200 kg).

In further embodiments, latch 24, lock 26 and handle 28 are relocated to side panels 14 (or not used), and system 10 is serviceable for use in a casting deck. In these embodiments, a number of individual storage units 10 are sometimes fitted together to provide a uniform surface with greater horizontal area, for example across the bow or aft section of a fishing boat or launch, and covered with a layer of carpeting or other material to reduce slipping.

In embodiments having horizontal drawer 38, middle panel 42 divides the interior of system 10 into vertical storage height H and drawer height D. Middle panel is 42 typically attached to side panels 14 via a routed or dado joint, supporting panel 42 at both ends of side-to-side length L. Depending upon embodiment, middle panel 42 sometimes extends the full front-to-back width W of side panels 14, and sometimes stops short, for example in the rear of storage system 10 as shown in FIG. 4A. In this embodiment, drawer 38 is typically shortened, such that a set of rear vertical storage units 30' extend the full (extended) height H +D of side panels 14, while front storage bins 30 extend only to (standard) bin height H.

Depending upon lure design, standard bay height H (above drawer 38) ranges from about 10 inches (about 25 cm) or more to about 24 inches (about 60 cm) or less, for example about 12 inches (about 30 cm), about 18 inches (about 45 cm) or about 24 inches (about 60 cm). Extended bay height H+D (without drawer 38) includes standard height H and height D of drawer 38, where drawer height D ranges from about 2 inches (about 5 cm) or more to about 6 inches (about 15 cm) or less. In these embodiments, some bays 30 are designed to accommodate long-tailed spinners and other larger-scale artificial baits for specialized fresh and salt water applications, with extended height H+D between about 12 inches (about 30 cm) and about 30 inches (about 75 cm). Alternatively, groups of individual bays 30 are provided in various height ranges H and H+D, for example from about 10-14 inches (about 25-35 cm), about 14-18 inches (about 35-45 cm), about 16-20 inches (about 40-50 cm), about 18-24 inches (about 45-60 cm), about 20-24 inches (about 50-60 cm), or about 24-30 inches (about 60-75 cm).

The top opening area of each storage bay 30 scales according to height H (or H+D), with each bin typically having a square or rectangular opening of at least 2 inches (about 5-8 cm) on a side, up to about 4-5 inches (about 10-15 cm) on a side. This corresponds to a total opening area of about 4 square inches (about 25 square cm) or more, and ranging up to about 25 square inches (about 160 square cm) or less. Depending on embodiment, moreover, the top portion of divider panels 18 is sometimes flexible in order to widen the opening area, as described above.

As shown in FIG. 4B, top panel 12 is also provided with overhang 41, which extends for distance G beyond side panels 14 in order to accommodate external storage of additional lures 11. In this embodiment, hook receivers 36 are typically provided in the top edge of side panel 14, so that cover panel 16 does not rest on hooks 31 when in the closed position. In some embodiments, overhang 41 also extends along the front of storage system 10, and in other embodiments there is no front overhang in order to accommodate a flush latch or locking mechanism, as shown in FIG. 4A.

Depending on embodiment, drainage and ventilation holes 32 are also provided in one or both of middle panel 42 and drawer 38, in order to increase airflow and fluid flow through storage system 10. Alternatively, drainage and ventilations holes 32 are provided in a lower section of side panels 14, just above middle panel 42, as shown in FIG. 4B. In this embodiment, drainage and ventilation holes 32 provide for air and fluid flow through vertical storage bins 30 (or vertical bins 30 and 30'), while panel 42 and drawer 38 provide a substantially watertight region for vertical storage of additional lures, tools and other equipment.

Figure 5:
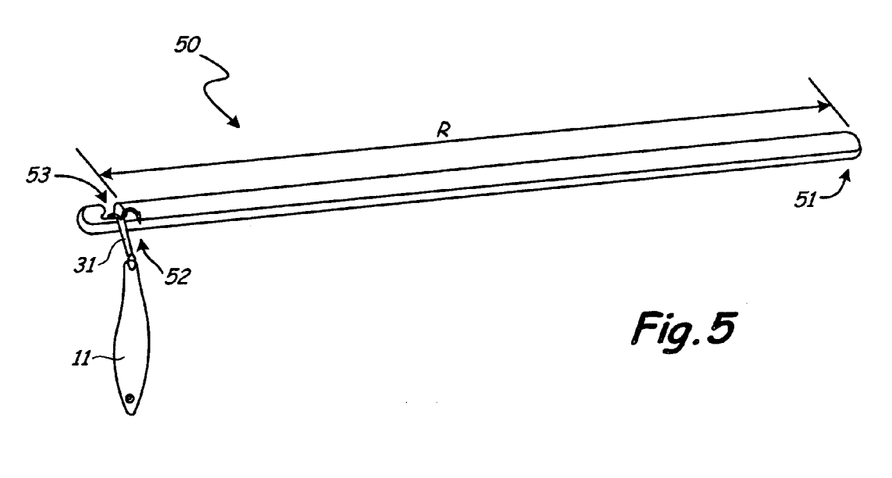
FIG. 5 is a perspective view of a lure retriever for a vertical tackle storage system as embodied in FIGS. 1-3 and 4A-4B.

FIG. 5 is a perspective view of lure retriever 50 for a vertical tackle storage system as embodied in FIGS. 1-3 and 4A-4B, above. Lure retriever 50 is typically formed of a thermoplastic similar to that used for the bottom, side and cover panels of the tackle storage system, and comprises first end 51 for holding lure retriever 50 with second end 52 having hook catch 53 for catching artificial lures 11 by hooks 31.

Lure retriever 50 is directed to an important issue of vertical storage, which is the fact that some lures 11 will inevitably drop to the bottom of the storage bays, either by accident or due to the need for quickly changing from one lure to another. When this occurs, it is typically difficult to retrieve the lure due to the relatively close tolerance between divider panels 18 and the body of lure 11, and because the aspect ratio of the vertical storage bay prevents an adult hand from fitting inside, even with flexible divider designs. In any case, hand retrieval can result in hook injuries or snagging, typically when a sleeve or cuff catches on an adjacent lure 11. Traditional tools such as needle-nosed pliers, moreover, do not typically extend far enough to be serviceable, even in the case of relatively long pliers and similar tools used for hook retrieval from pike, eel, muskellunge and other sharp-toothed game fish.

This problem is addressed by providing the storage system one or more lure retrievers 50. Lure retriever 50 is typically stored in one of the vertical bays, with or without an adjacent hanging lure 11. Reach R of retriever 50 is measured from first end 51 to hook catch 53, and scaled according to vertical bay height H (or H+D). In particular, reach R is typically greater than half the bay height, and sufficient for the user to retrieve lure 11 by catching one or more hooks 51 on hook catch 53, while first end 51 is held above the storage bin. This quickly and efficiently allows for the retrieval of dropped lures 11, without substantial risk of hook injury or snagging on adjacent lures.

Figure 6:
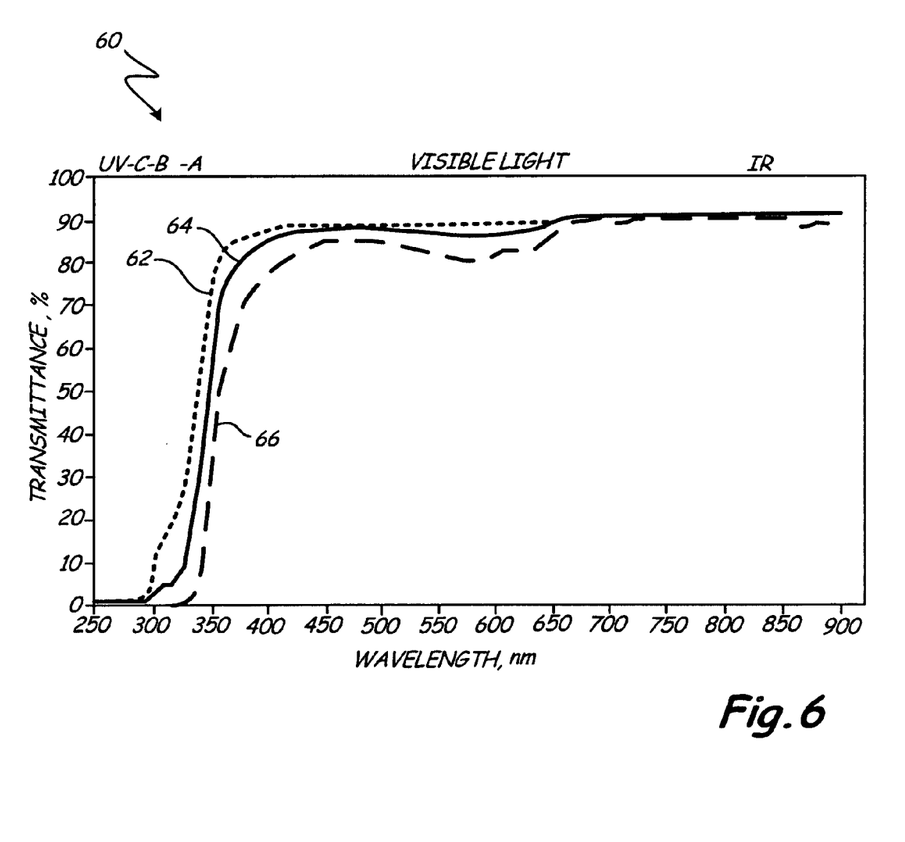
FIG. 6 is a light transmittance or transparency plot for representative panel materials used in construction of a vertical tackle storage system as embodied in FIGS. 1-3 and 4A-4B.

FIG. 6 is a light transmittance or transparency plot for representative panel materials used in the construction of vertical tackle storage systems as embodied in FIGS. 1-3 and 4A-4B, above. In particular, plot 60 provides the transmittance (in percent) for polycarbonate materials of thickness 2 mm (line 62), 4 mm (line 64), and 10 mm (line 66), respectively, as plotted against wavelength for a range of ultraviolet, visible and infrared radiation.

As shown in FIG. 6, suitable panel materials typically have greater than about 80% transmittance across the entire visible spectrum, when provided in thicknesses of up to about 10 mm (about ⅜ inch). This is the case for typical bottom, side, top and divider panels. Some suitable materials also have greater than about 80% transmittance for infrared radiation up to about 900 nm, when provided in the same thicknesses. This reduces the "greenhouse" effect when the tackle storage system is exposed to direct sun, and assists in the use of ventilation and drainage holes to reduce the interior-exterior temperature differential as described above.

Some suitable polycarbonate materials also provide protection from ultraviolet (UV) radiation, which over time can degrade organic-based bait materials, fade colors, and damage paints and other finishes. In these embodiments, the panel material is typically has transmittance of less than about 10% for UV-B radiation (about 280-320 nm) and less than about 5% for UV-C radiation (about 100-280 nm), when provided in thicknesses of greater than about 4 mm (about 5/32 inch). In some embodiments, the transmittance is less than about 5% for UV-B radiation and less than about 1% for UV-C radiation, given the same thickness limit.

Most suitable materials are also substantially opaque (less than 1% transmittance) to radiation in the far UV. The UV-B and UV-C range down to about 200 nm is more relevant, however, because radiation below about 200 nm is rapidly absorbed in the atmosphere and because UV-A radiation is substantially less damaging than UV-B and UV-C radiation below 320 nm.

While this invention has been described with reference to particular embodiments, the terminology used is for the purposes of description, not limitation, and workers skilled in the art will recognize that changes may be made in form and detail without departing from the invention's spirit and scope. Thus the invention encompasses all embodiments falling within the scope of the appended claims, including the substitution of various equivalents for particular elements of the invention and adaptation of the invention's teachings to different materials, situations and circumstances.

The invention claimed is:

1. A storage system comprising:
   a bottom;
   a plurality of sides fixed to the bottom;
   a cover located opposite the bottom and having open and closed positions with respect to the sides;
   a plurality of vertical dividers arranged in first and second transverse orientations between the sides, such that the dividers form vertical storage units for hanging lures, wherein the vertical dividers are formed to approximately a same height as the sides, extending approximately to the cover, such that the cover is supported on the dividers and the sides; and
   a plurality of ventilation and drainage holes formed in the bottom panel;
   wherein the top and at least two of the sides are transparent to visible light; and
   wherein each of the bottom, sides, and cover is formed of an impact-resistant thermoplastic having a thickness of at least 4 mm (or at least 5/32 inch), providing sufficient horizontal area, strength and rigidity for the cover to support two or more adult anglers with a total mass of at least 200 kg (or a weight of at least 440 lbs) when in the closed position.

2. The storage system of claim 1, wherein the impact-resistant thermoplastic has a glass transition temperature greater than 100° C.

3. The storage system of claim 2, wherein the impact-resistance thermoplastic has a transmittance of at least 80% for visible light, when provided in the thickness of at least 4 mm (or at least 5/32 inch).

4. The storage system of claim 3, wherein the impact-resistant thermoplastic has a transmittance of less than 10% for UV-B and UV-C radiation and a transmittance of at least 80% for infrared radiation of up to about 900 nm, when provided in the thickness of at least 4 mm (or at least 5/32 inch).

5. The storage system of claim 1, wherein the ventilation and drainage holes provide sufficient interior fluid flow to limit an interior/exterior temperature differential of the tackle storage system to about 10° C. or less, under ambient conditions of full sun and an outside temperature of up to 30° C.

6. The storage system of claim 1, wherein a plurality of the vertical storage units for hanging lures each have a height between about 25 cm (or about 10 inches) and about 75 cm (or about 30 inches) and an opening area of at least 25 square cm (or at least 4 square inches).

7. The storage system of claim 6, further comprising a lure retriever for retrieving the lures from the vertical storage units, wherein the lure retriever comprises a first end for holding the lure retriever and a second end for retrieving the lures, the second end having a hook catch for catching hooks on the lures.

8. The storage system of claim 7, further comprising a plurality of hook receivers for hanging the lures in the vertical storage units by the hooks, such that the cover panel does not contact the hooks when in the closed position.

9. The storage system of claim 7, wherein the cover panel comprises an overhang extending outside the side panels to accommodate additional lures hanging on a side panel, outside the vertical storage units and under the overhang.

10. The storage system of claim 1, further comprising a hinge for attaching the cover panel to one of the side panels, such that the cover panel pivots between the open position and the closed position while remaining attached to the side panel.

11. The storage system of claim 10, further comprising a lock for locking the cover panel in the closed position and a cable aperture for accepting a cable lock in order to secure the tackle storage system to one or more of a boat, a trailer and a motor vehicle.

12. A tackle box comprising:
    a bottom panel;
    a plurality of side panels fixed to the bottom panel;
    a cover panel attached to one of the side panels via a hinge, such that the cover panel has an open position and a closed position;
    a plurality of vertical divider panels nested between the side panels in first and second transverse orientations in order to form vertical storage bins for hanging artificial lures, wherein the vertical divider panels are formed to approximately a same height as the sides panels, extending approximately to the cover panel, such that the cover panel is supported on the vertical divider panels and the side panels; and
    a plurality of ventilation and drainage holes formed in the bottom panel;
    wherein the cover panel and at least two of the side panels are formed of a strong, impact-resistant and transparent panel material having a thickness of at least 4 mm (or at least 5/32 inch), providing sufficient horizontal area, strength and rigidity for the cover panel to support two or more adult anglers with a total mass of at least 200 kg (or a weight of at least 440 lbs) when in the closed position.

13. The tackle box of claim 12, wherein the panel material comprises a thermoplastic having a glass transition temperature greater than 100° C. and a transmittance of at least 80% for visible light and less than 10% for UV-B and UV-C radiation, when provided in the thickness of at least 4 mm (or at least 5/32 inch).

14. The tackle box of claim 12, wherein a plurality of the vertical storage bins each have a height between about 25 cm (or about 10 inches) and about 75 cm (or about 30 inches) and an opening area of at least 25 square cm (or at least 4 square inches).

15. The tackle box of claim 14, further comprising a lure retriever for retrieving the artificial lures from a bottom of the vertical storage bins, the lure retriever having a first end and a second end with a hook catch, wherein a reach of the lure retriever between the first end and the hook catch is scaled to retrieve the artificial lures from a bottom of the vertical storage bins by catching a hook with the hook catch.

16. The tackle box of claim 15, further comprising a horizontal storage drawer that extends only partially from a front of the tackle box to a back of the tackle box, such that the height of the plurality of vertical storage bins is greater in the back of the tackle box than in the front of the tackle box.

17. A vertical tackle storage system comprising:
a horizontal bottom panel;
a plurality of vertical side panels fixed to the horizontal bottom panel;
a cover panel hinged to one of the side panels, such that the cover panel pivots between a horizontal closed position and a vertical open position;
a plurality of vertical divider panels positioned between the vertical side panels in first and second transverse orientations, such that the divider panels and the side panels form a plurality of vertical storage bins for hanging artificial baits by hooks, the plurality of vertical storage bins having a height between about 10 inches and about 30 inches, wherein the divider panels are formed to approximately a same height as the side panels, extending approximately to the cover panel, such that the cover panel is supported on the divider panels and the side panels;
a plurality of ventilation and drainage holes formed in the bottom panel; and
a lure retriever having a first end and a second end with a hook catch for retrieving the artificial baits from the vertical storage bins by catching the hooks;
wherein each of the bottom panel, the side panels and the cover panel are formed of a strong, impact-resistant and transparent material having a thickness of at least 4 mm (or at least 5/32 inch), providing sufficient horizontal area, strength and rigidity for the cover panel to support two or more adult anglers with a total mass of at least 200 kg (or a weight of at least 440 lbs) when in the closed position.

18. The vertical tackle storage system of claim 17, wherein the strong, impact-resistant and transparent material comprises a thermoplastic having a glass transition temperature greater than 100° C. and a transmittance of at least 80% for visible light and less than 10% for UV-B and UV-C radiation, when provided in the thickness of at least 4 mm (or at least 5/32 inch).

19. The tackle storage system of claim 17, wherein the plurality of ventilation and drainage holes provide sufficient drainage to rinse the artificial baits with water and sufficient ventilation to dry the artificial baits when the cover is in the closed position.

\* \* \* \* \*